US012623700B2

(12) United States Patent
 Haas et al.

(10) Patent No.: US 12,623,700 B2
(45) Date of Patent: May 12, 2026

(54) BRAKING SYSTEM AND METHOD

(71) Applicant: Transportation IP Holdings, LLC, Norwalk, CT (US)

(72) Inventors: Carl L. Haas, Walkersville, MD (US); Charles L. Wolf, Olney, MD (US)

(73) Assignee: Transportation IP Holdings, LLC, Norwalk, CT (US)

( * ) Notice: Subject to any disclaimer, the term of this patent is extended or adjusted under 35 U.S.C. 154(b) by 977 days.

(21) Appl. No.: 17/224,929

(22) Filed: Apr. 7, 2021

(65) Prior Publication Data

US 2021/0323590 A1     Oct. 21, 2021

Related U.S. Application Data

(60) Provisional application No. 63/010,184, filed on Apr. 15, 2020.

(51) Int. Cl.
 *B61L 15/00*     (2006.01)
 *B60T 13/66*     (2006.01)
 *B60T 17/22*     (2006.01)

(52) U.S. Cl.
 CPC ........ *B61L 15/0027* (2013.01); *B60T 13/662* (2013.01); *B60T 17/228* (2013.01)

(58) Field of Classification Search
 CPC ............. B61L 15/0027; B61L 15/0036; B61L 15/0054; B60T 13/662; B60T 17/228; B60T 13/665
 See application file for complete search history.

(56) References Cited

U.S. PATENT DOCUMENTS

| | | | |
|---|---|---|---|
| 6,273,521 B1 | 8/2001 | Halvorson et al. | |
| 2003/0183729 A1 | 10/2003 | Root et al. | |
| 2008/0128562 A1 | 6/2008 | Kumar et al. | |
| 2010/0174427 A1 | 7/2010 | Sivasubramaniam et al. | |
| 2016/0229422 A1* | 8/2016 | Schoenly | B61L 3/006 |
| 2017/0129511 A1 | 5/2017 | Crane et al. | |
| 2017/0232943 A1 | 8/2017 | Brooks et al. | |
| 2018/0170413 A1 | 6/2018 | Wright et al. | |
| 2019/0168728 A1* | 6/2019 | Venkatasubramanian | B60T 13/665 |

OTHER PUBLICATIONS

Examination Report for corresponding AU Application No. 2021202236 dated May 26, 2022.
Federal Register "Part V Department of Transportation, 49 CFR Parts 229, 232, and 238 Electronically Controlled Pneumatic Brake System", vol. 72, No. 170, Tuesday, Sep. 4, 2007, Proposed Rules (35 pages).

* cited by examiner

*Primary Examiner* — Abby J Flynn
*Assistant Examiner* — Kyle J Kingsland
(74) *Attorney, Agent, or Firm* — K&L Gates LLP

(57)     ABSTRACT

A system and a method includes one or more processors to control operation of an air brake system having plural braking devices each disposed on a different vehicle of a vehicle system and configured to control braking efforts in the air brake system via the braking device disposed onboard the corresponding vehicle. The one or more processors may communicate one or more command messages to the braking devices to control one or more of a rate of a braking effort propagation along the vehicle system or a direction of the braking effort propagation between the plural braking devices.

20 Claims, 4 Drawing Sheets

BRAKING SYSTEM AND METHOD

CROSS-REFERENCE TO RELATED APPLICATIONS

This application claims priority to U.S. Provisional Application No. 63/010,184, filed Apr. 15, 2020, and is incorporated by reference herein in its entirety.

BACKGROUND

Technical Field

The subject matter described relates to braking systems and methods.

Discussion of Art

Vehicle systems may move together in the form of a consist where two or more vehicles may be mechanically coupled together. For example, a rail vehicle system may include two or more rail vehicles that may move together along a track. As the rail vehicle system moves along the track, the system may need to slow or stop movement. Some known rail vehicle systems include traditional pneumatic brake systems that operate based on an amount of brake pipe pressures within an airbrake conduit that extends along the length of the vehicle system. When a braking application is made, the car behind the lead vehicle begins to apply brakes first, then the second car, then the third car, etc., as the brake application signal (e.g., a change in the air pressure of the airbrake conduit) propagates down the length of the train.

One technical limitation with traditional pneumatic braking systems is that when the braking application starts at the lead vehicle and moves towards the rear vehicles, the train bunches up as the front of the train slows faster than the rear of the train, and slack between rail vehicles is compressed within the draft gears. Another technical limitation is the propagation of a release of the brake command along the vehicle system. When a brake release application is made with traditional pneumatic braking systems, the same front-to-rear braking signal propagation causes the brakes of the front of the train to release before the brakes at the rear, causing the train to stretch as the front of the train begins to move or move faster than the rear of the train.

Furthermore, vehicle systems may be equipped with electronically controlled pneumatic (ECP) braking systems that command all cars within a train via an electronic signal. With ECP systems, all cars apply and release brakes together, resulting in a status-quo of train slack between cars. For example, if a train is bunched before an ECP brake application, it will remain bunched after the application. Alternatively, if the train is stretched before the ECP brake application, it will remain stretched after the brake application.

BRIEF DESCRIPTION

In one or more embodiments, a system includes one or more processors to control operation of an air brake system having plural braking devices each disposed on a different vehicle of a vehicle system and configured to control braking efforts in the air brake system via the braking device disposed onboard the corresponding vehicle. The one or more processors may communicate one or more command messages to the braking devices to control one or more of a rate of a braking effort propagation along the vehicle system or a direction of the braking effort propagation between the plural braking devices.

In one or more embodiments, a system includes one or more processors to control operation of an air brake system having plural braking devices each disposed onboard a different vehicle of a vehicle system and configured to control braking efforts in the air brake system via the braking device disposed onboard the corresponding vehicle. The one or more processors may communicate one or more command messages to the braking devices. The command messages may include a vehicle identifier associated with one or more of the braking devices or the different corresponding vehicles. A first command message including a first vehicle identifier may be received by a first braking device and a second command message comprising a second vehicle identifier may be received by a second braking device. The one or more command messages may control one or more of a rate of a braking effort propagation along the vehicle system or a direction of the braking effort propagation between the plural braking devices.

In one or more embodiments, a method includes communicating one or more command messages to plural braking devices of an air brake system. Each of the plural braking devices may be disposed onboard a different vehicle of a vehicle system. The one or more command messages may control braking efforts in the air brake system via the braking device disposed onboard the corresponding vehicle. The one or more command messages may control a direction of a braking effort propagation between the plural braking devices by controlling the braking devices based on locations of the plural braking devices. The one or more command messages may control a rate of the braking effort propagation along the vehicle system in order to control a distance between two or more vehicles of the vehicle system.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
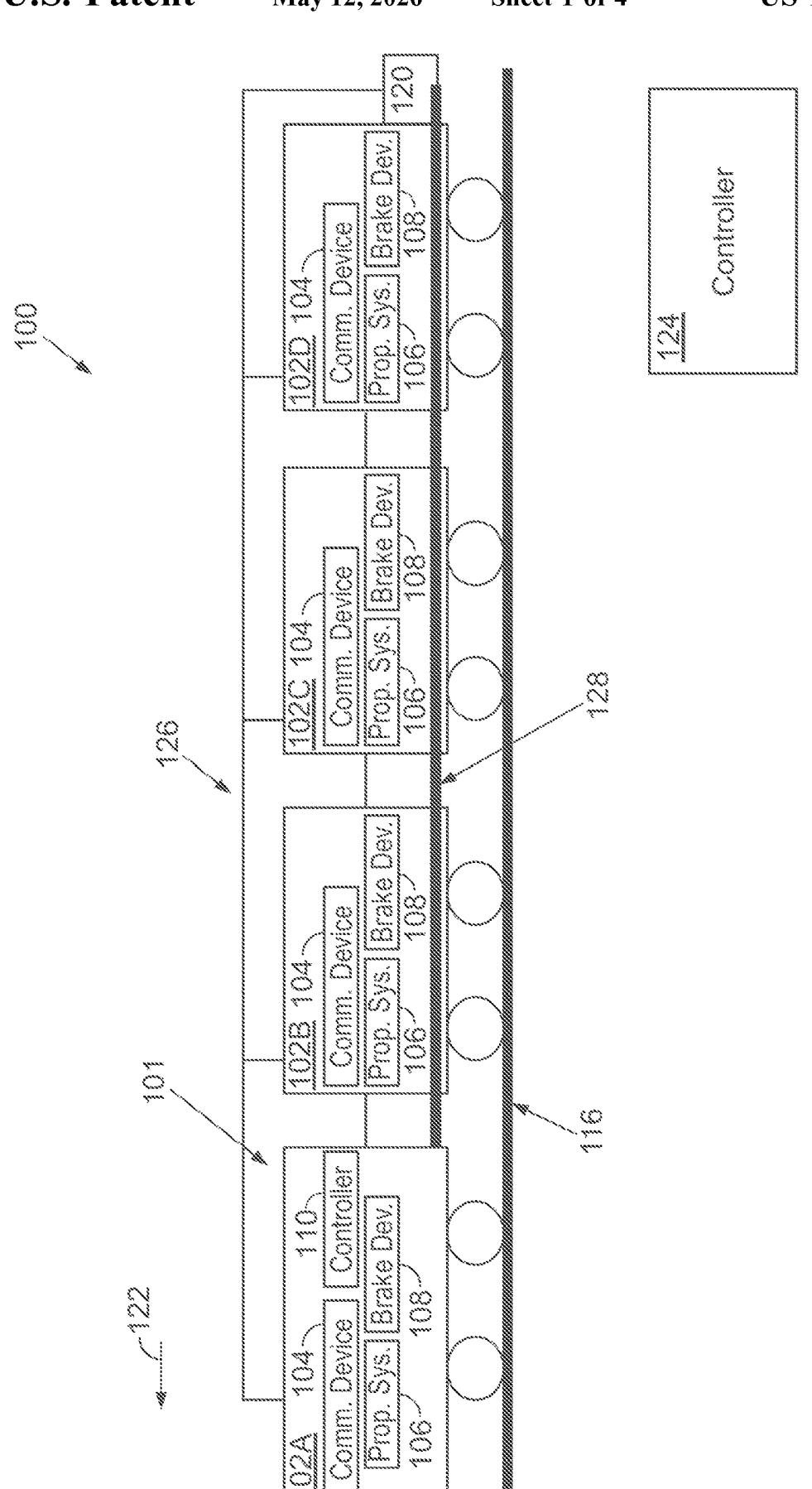
FIG. 1 illustrates one example of a braking controller system in accordance with one embodiment.

Embodiments of the subject matter described herein relate to braking systems and methods that control braking applications of different vehicles in a vehicle system to control a rate and/or direction of braking applications as the braking applications propagate along a length or within the vehicle system. The controllers may control the braking applications of different vehicles of a vehicle system by communicating command messages with the different vehicles of the vehicle system. The command messages may direct the different vehicles to begin or start a braking application at a time, to start a braking application based on a location of the vehicle, based on a location of the vehicle relative to a location of another vehicle of the vehicle system, or the like. As one example, braking applications of a vehicle system may be controlled such as in a braking propagation vector. The braking propagation vector may include direction and/or rate in which braking actions occur along a length of the vehicle system. The direction of the vector can be front to back, back to front, middle to out, out to in, same direction concurrently in different segments of the vehicle system, different directions concurrently in different segments of the vehicle system, middle to out concurrently in different segments of the vehicle system, out to in concurrently in different segments of the vehicle system, or the like. The rate of the vector can be how rapidly the change in braking action occurs or is implemented.

Directing the vehicles how and/or when to begin braking applications can control a rate and/or direction of braking applications as the braking applications propagate along a length of or within the vehicle system. For example, each braking device of the corresponding vehicle may perform the braking action instructed within the command message in order to achieve a desired propagation, such as from a rear vehicle toward a front vehicle, from a middle vehicle towards the front and rear vehicles, from the front and rear vehicles toward the middle, or the like.

Controlling the braking actions of vehicles of a vehicle system (e.g., direction of braking between different vehicles, rate of braking or time between braking actions of different vehicles, amount of braking of one vehicle relative to an amount of braking of another vehicle, or the like) may control the vehicle system to slow movement or stop to achieve a final rest or stop position of the vehicles relative to each other vehicle. For example, the command messages may control the vehicles to achieve an amount of slack or bunching between different vehicles or portions of vehicles of the vehicle system. Optionally, the command message may control the vehicles to achieve stopping a first vehicle at a first location, and/or stopping a second vehicle at a second location. Optionally, the command message may control an amount of time between the braking application begins and the vehicle system slows to a predetermined speed or comes to a complete stop. Optionally, the command message may control the braking actions as a vehicle system traverses a route feature, such as a geographic feature (hill, valley, or the like) and/or an infrastructure feature (e.g., bridge, cave, switch, route intersection, or the like). Optionally, the command message may control the braking actions to control an amount of braking that may be felt or observed by a passenger onboard the vehicle system.

While some embodiments described herein relate to rail vehicle systems having electronically controlled pneumatic (ECP) air brake systems, not all embodiments of the inventive subject matter are restricted to rail vehicles, ECP air brake systems, or other air brake systems. One or more embodiments of the inventive subject matter may relate to other types or models of vehicle systems, such as automobiles, trucks, buses, mining vehicles, marine vessels, aircraft (manned or unmanned, such as drones), agricultural vehicles, or other off-highway vehicles. Additionally, the vehicle systems may include two or more different types of vehicles that may operate as a common vehicle system and that may communicate with each other via the off-board database. For example, the vehicle system may comprise a rail vehicle that may communicate with an unmanned aerial vehicle via the off-board database, or an aircraft that communicates with a marine vessel.

FIG. 1 illustrates one example of a braking controller system 100 in accordance with one embodiment. The system includes a vehicle system 101 that moves along a route 116 in a direction 122. The vehicle system can be a rail vehicle system, but optionally can be automobiles, trucks, buses, mining vehicles, marine vessels, aircraft, agricultural vehicles, or other off-highway vehicles. The illustrated vehicle system includes plural vehicles 102A-D that are mechanically coupled together. Optionally, the vehicle system can be formed by one or more vehicles that may travel together (by being mechanically coupled or by being mechanically separate but communicating with each other to travel together, such as in a convoy). The vehicle system travels along the route 116, such as tracks, roads, highways, land-based paths, airborne paths, waterways, or the like.

Figure 2:
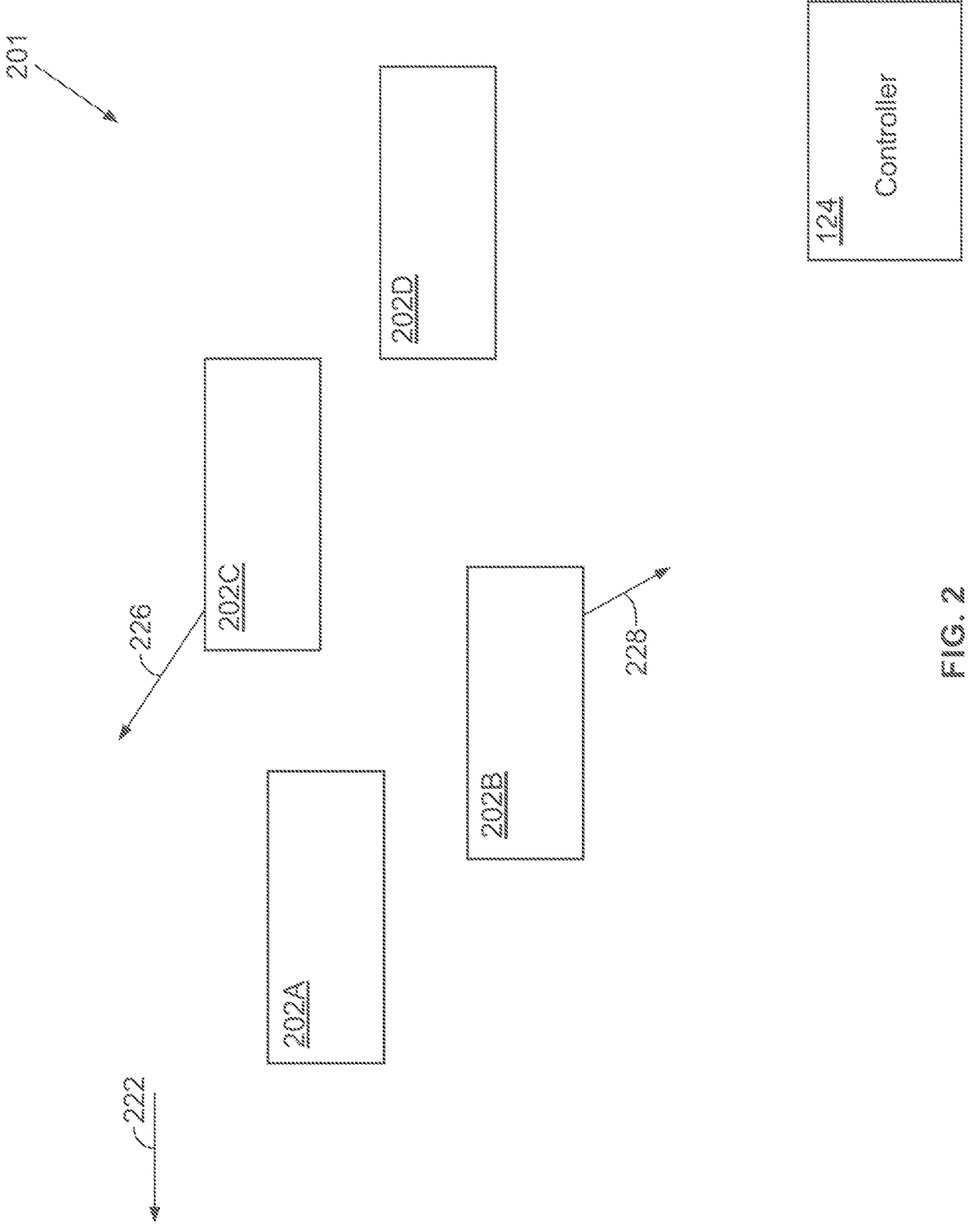
FIG. 2 illustrates another vehicle system in accordance with one embodiment.

For example, FIG. 2 illustrates another example of a vehicle system 201. The vehicle system 201 includes plural vehicles 202A-D that are mechanically separated from each other, but may move together in one or more different directions relative to each other, such as in a convoy. In one embodiment, each of the vehicles 202A-D may move in a common direction 222. In another embodiment, one or more of the vehicles may move in other directions, such as a vehicle 202B that may move in a direction 228, or a vehicle 202C that may move in a direction 226. As one example, the vehicle system may represent a swarm of drones, and each drone may move in any three-dimensional direction relative to each other drone. As another example, one of the vehicles may be an underwater marine vessel, such as a submarine, and another vehicle of the vehicle system may be an above-water marine vessel, such as a boat. The submarine and the boat may move together, such as in a convoy, with the vehicles moving in different three-dimensional directions relative to each other.

Returning to FIG. 1, the vehicle system includes a controller 110, which may be referred to as an onboard controller. The onboard controller represents hardware circuitry that includes and/or is connected with one or more processors that perform operations described in connection with the onboard controller. The onboard controller can communicate with onboard and/or off-board components via a communication device 104. In one or more embodiments, a first vehicle 102A may represent a lead vehicle, such that the lead vehicle may communicate command messages to each of the other vehicles of the vehicle system. Optionally, one or more of the vehicles may include controllers, such that the vehicles comprising controllers may generate one or more electronic command messages to be communicated to other vehicles.

Each of the vehicles 102B-D include communication devices 104, that may be the same as or similar to other communication devices described herein. As one example, the lead vehicle may communicate electronic command messages to one or more vehicles via the communication devices onboard the vehicles. Optionally, one or more vehicles may communicate with an off-board controller 124. For example, the off-board controller may communicate with the onboard controller of the vehicle system, and/or communicate with the communication devices onboard the one or more vehicles. The off-board controller can represent hardware circuitry that includes and/or is connected with one or more processors that perform operations of the off-board controller. In one or more embodiments, the off-board controller can communicate with the onboard controller of the vehicle system to control or restrict movement of the vehicle system. For example, the off-board controller can communicate with the onboard controller of the vehicle system to notify the vehicle system where the vehicle system is allowed to travel, how fast the vehicle system is allowed to travel, or the like.

In one or more embodiments, a communication cable 126 may extend along the length of the vehicle system. The communication cable may enable wired communication between the vehicles and a vehicle signaling and monitoring device 120 coupled with the vehicle system. In one or more embodiments, one or more communication devices of one or more vehicles may include and/or represent transceiving circuitry, one or more antennas, modems, or the like. In the illustrated embodiment, the communication cable extends the entire length of the vehicle system and is operably coupled with each of the vehicles of the vehicle system. Optionally, the communication cable may extend any length and/or be operably coupled with one or more vehicles of the vehicle system. The communication devices may interact with other systems via the wired communication cable. Optionally, the communication devices may include the hardware and/or software to communicate via other types, such as, but not limited to, cellular networks (e.g., the Global System for Mobile Communications (GSM)), mesh networks using Ethernet standards, wireless communication protocols (e.g., Bluetooth), radio and shortwave communication types, or the like.

In one or more embodiments, where two or more communication types are present, the communication device of the communication system may translate some or all of a data stream from one type to another. Similarly, different data protocols may be used. Such translation may allow the communication device of the communication system to act as a transference point for data transmission. The translation may allow for different types of equipment (e.g., first and second vehicles may each use communication types different from each other to communicate with each other via the communication system). The communication device may switch types, protocols, and/or communication pathways in response to delegation of signal or failure of one pathway. This may provide redundancy of communication by the communication system. In one embodiment, the communication device may decrypt, decompile, or disaggregate information, parse information, and send along all or part of a message (e.g., alone or combined with new data, or with encryption, or both). The communication device may be the same as or similar to other communication devices or communication systems described herein.

In one embodiment, the off-board controller may represent a back-office server of a positive vehicle control (PVC) system. A PVC system is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board controller represents another computerized system that communicates with vehicle systems described herein.

The onboard and/or off-board controllers may include an input and/or output device (not shown) for use by an operator to manually control one or more operations, settings, or the like, of the onboard and/or off-board controllers. In one or more embodiments, the onboard and/or off-board controllers may include a memory or storage system (not shown). For example, a memory can store information about the vehicle system, the route, or the like. Nonlimiting examples of information that may be stored in the memory of the onboard and/or off-board controllers may include identification of each of the vehicles of the vehicle system, data related to the route, how the vehicle is or has been operated as the vehicle system moves along the route, time stamps related to when the vehicle system moves or moved passed wayside devices, moved from a first geospatial area into a different geospatial area, when the vehicle system is moving and when the vehicle system is stationary, current and passed propulsion settings of the vehicle system, current and passed braking settings of the vehicle system, time stamps and/or propulsion and braking settings to when the vehicle system moves or moved passed route features (e.g., geographic features such as hills or valleys, infrastructure features such as bridges, rail switches, pedestrian and/or vehicle crossings or intersections, or the like). In one or more embodiments, the onboard and/or off-board controller may correlate two or more informational data with each other to understand how the vehicle system moves along the route, or did move along the route during one or more past traversals of the vehicle system along the route.

In one or more embodiments, the vehicle signaling and monitoring device 120 may be coupled with the vehicle system. The vehicle signaling and monitoring device may also be referred to as an end-of-train (EOT) or end-of-vehicle (EOV) device. The EOV device includes a housing and a monitoring device disposed within the housing. The EOV monitoring device may monitor the vehicle system and/or the route along which the vehicle system moves. In one or more embodiments, the vehicle system to which the monitoring device is coupled can be referred to as an end-of-train (EOT) vehicle or end-of-vehicle (EOV) vehicle. The EOT device may be a transferrable device that may be moved from one vehicle to another vehicle that may change the designation of the respective vehicle from which the EOT device is removed, and the other vehicle where the EOT is moved to may be identified as a new EOT vehicle.

In one or more embodiments, the vehicle system may include one or more energy storage devices that store and/or generate electric current. This current can be used to power components onboard the vehicle system, such as the propulsion system, a lighting system, or the like. Optionally, the energy storage devices can include or represent one or more motors of the propulsion system and/or the brake system (e.g., where the motors generate current during regenerative braking). The energy storage devices can include one or more batteries, fuel cells, photovoltaic devices, flywheels, alternators, generators, or the like. The onboard controller can communicate control signals to the energy storage devices to control supply of the current to one or more components of the vehicle system.

The vehicle system includes a propulsion system 106 that operates to move the vehicle system along the route. The propulsion system can represent one or more engines, motors, transmissions, propellers, or the like, that generate propulsion to move the vehicle system. The propulsion system may include one or more propulsion devices that may be distributed across one or more vehicles of the vehicle system. The propulsion devices may operate together to control movement of the vehicle system. In one or more embodiments, one or more vehicles may include individual propulsion systems that may operate independent of the other propulsion systems of other vehicles.

In one or more embodiments, the vehicle system may include one or more energy storage devices that store and/or generate electric current. This current can be used to power components onboard the vehicle system, such as the propulsion system, a lighting system, or the like. Optionally, the energy storage devices can include or represent one or more motors of the propulsion system and/or the brake system (e.g., where the motors generate current during regenerative braking). The energy storage devices can include one or more batteries, fuel cells, photovoltaic devices, flywheels, alternators, generators, or the like. The onboard controller can communicate control signals to the energy storage devices to control supply of the current to one or more components of the vehicle system.

The vehicle system also can include a brake system that operates to slow or stop movement of the vehicle system. The brake system can include air brakes, friction brakes, motors (e.g., used for dynamic or regenerative braking), or the like. The brake system may include one or more braking devices 108 that may be distributed across one or more vehicles of the vehicle system. As one example, the brake system may be an air brake system, and a brake pipe 128 may extend between and be coupled with the braking systems of one or more vehicles of the vehicle system. The brake pipe may provide air pressure that may be used to control a braking application by one or more braking systems of the vehicle system. For example, in a known airbrake system, brake pipe pressure may be decreased to cause the brake cylinder pressure to increase. The increase in the brake cylinder pressure may cause the brake effort of the braking device of the vehicle to increase (e.g., brake harder). Additionally, the brake pipe pressure may be increased to cause the brake cylinder pressure to decrease, causing the brake effort of the braking device in the vehicle to decrease (e.g., soften the braking effort). Optionally, the braking effort of the braking device of the corresponding vehicle may restrict movement of the vehicle and/or the vehicle system, may change movement of the vehicle and/or vehicle system, may control movement of the vehicle and/or vehicle system, or the like. The braking devices may operate together to control movement of the vehicle system. As another example, the brake system may be another type of braking system. One or more vehicles may include individual brake systems and/or devices that may operate independent of the other brake systems and/or devices of other vehicles.

The onboard controller can communicate control signals with the propulsion system and/or the brake system to control or change movement of the vehicle system. In one or more embodiments, the onboard controller may generate the control signals that may be communicated with the propulsion systems and/or brake systems of the vehicles. Optionally, the off-board controller may generate and communicate control signals with the onboard controller to communicate the control signals with the vehicles of the vehicle system. Optionally, the off-board controller may communicate directly with one or more of the vehicles. Optionally, a combination of the off-board controller and/or the onboard controller may generate and/or communicate control signals with one or more vehicles of the vehicle system.

In one or more embodiments, the brake system may be an electronically controlled pneumatic (ECP) braking system. For example, an electronic braking command may be electronically communicated with one or more vehicles of the vehicle system. The brake command may be communicated via a wireless type of communication or via a wired type of communication, such as via the communication cable. The braking command may be generated by the vehicle signaling and monitoring device and communicated with each vehicle. Optionally, the braking command may be generated by the onboard controller and communication with each vehicle. Optionally, the braking command may be generated by the off-board controller and communicated with the onboard controller, and/or communicated directly with the vehicle signaling and monitoring device, and/or communicate directly with one or more vehicles of the vehicle system. Optionally, the brake command may be generated and/or communicated by a combination of two or more examples therein.

One technical limitation with traditional pneumatic braking systems is that when the braking application starts at the lead vehicle and moves towards the rear vehicles, the train bunches up as the front of the train slows faster than the rear of the train, and slack between rail vehicles is compressed within the draft gears. Another technical limitation is the propagation of a release of the brake command along the vehicle system. When a brake release application is made with traditional pneumatic braking systems, the same front-to-rear braking signal propagation causes the brakes of the front of the train to release before the brakes at the rear, causing the train to stretch as the front of the train begins to move or move faster than the rear of the train.

Additionally, one technical limitation with known ECP braking systems is that all cars apply and release brakes together, resulting in a status-quo of slack or distance between vehicles. For example, if a train is bunched before an ECP brake application, it will remain bunched after the application. Alternatively, if the train is stretched before the ECP brake application, it will remain stretched after the brake application. However, it may be preferred to control and/or change an amount of slack and/or bunching between vehicle, to control a position where one vehicle stops, to control a rate at which a braking application propagates along or within the vehicle system, control a direction at which the braking application propagates between different braking devices, or the like. The one or more processors of the onboard controller, the off-board controller, and/or the vehicle signaling and monitoring device may generate and/or communication electronic command messages to control operations of the braking devices of the one or more vehicles. For example, the braking system may be an air brake system, and the command messages may include one or more instructions of implementations directing the vehicles how and/or when to implement the command messages. The instructions of implementations may be based on or include a time to implement the command message, a location to implement the command message, or the like. The instruction of implementation may be communicated ahead of a braking event of the vehicle system. Optionally, the instruction of implementation may be communicated at a time the braking application is to begin, such as in an emergency braking event.

In one or more embodiments of a vehicle system having an air brake system, the command messages may control a rate of braking effort propagation along a vehicle system. The rate of the braking effort propagation may be based on a time between braking efforts conducted by different vehicles of the vehicle system. The braking efforts may be increased (e.g., brake harder), may be decreased (e.g., decrease an amount of braking, let up or release the brakes, brake less hard, or the like), or a combination of the two. The command messages may control a rate at which the braking efforts of the individual braking devices of the corresponding vehicles. For example, a braking effort of the braking device a first vehicle may change (e.g., increase or decrease) at a first time, a braking effort of the braking device of a second vehicle may change (e.g., increase or decrease) at a second time that is after the first time, a braking effort of a braking device of a third vehicle may change (e.g., increase or decrease) at a third time that is after the first and second times, etc. The rate of the braking effort propagation along the vehicle system may be based on the time between braking applications of different vehicles. In one or more embodiments, the braking efforts of each vehicle of the vehicle system may increase or decrease. Optionally, the braking efforts of one or more vehicles may increase, and the braking efforts of one or more other vehicles of the vehicle system may decrease. In one or more embodiments, the command message may include a time for each braking device to begin the corresponding braking effort in the respective air brake device of the corresponding vehicle to control the rate of the braking effort propagation along the vehicle system.

In one or more embodiments, the first vehicle may exert a braking effort of a first amount, and the second vehicle may exert a braking effort of a second amount that may be different than the first amount. For example, the first vehicle may brake harder or softer than the second vehicle. The command message may direct the first and second vehicles to initiate the braking efforts of the first and second vehicles such that the first and second vehicles may brake at the same or substantially the same time, or at different times to control a rate of braking efforts of the vehicle system between the first and second vehicles.

In one or more embodiments, the command messages may control a direction of the braking effort propagation between and among the braking devices of the one or more vehicles. For example, the command messages may control the vehicles to brake in a direction from a lead vehicle towards a rear vehicle, in a direction from the rear vehicle towards the lead vehicle, in directions from a middle vehicle toward the lead and rear vehicles (e.g., from a middle position towards outer positions), from the lead and rear vehicles toward the middle vehicle, or any combination therein. In one or more embodiments, the rate of the braking effort propagation may change in the air brake system propagates may vary based on whether the direction is from a lead vehicle toward a rear vehicle, from a rear vehicle toward a lead vehicle, from a middle vehicle toward lead and rear vehicles, from the lead and rear vehicles toward the middle vehicle, or the like. For example, the lead, second, and third vehicles may brake in a direction from the lead toward the third vehicle at a first rate, and the rear, and second to rear vehicles may brake in a direction from the rear vehicle toward the second to rear vehicle at a different, second rate. In one or more embodiments, the rate of propagation of braking efforts may be controlled based on a nature of a braking event, such as an emergency braking event, a scheduled braking event, or the like.

Figures 3, 4, 5:
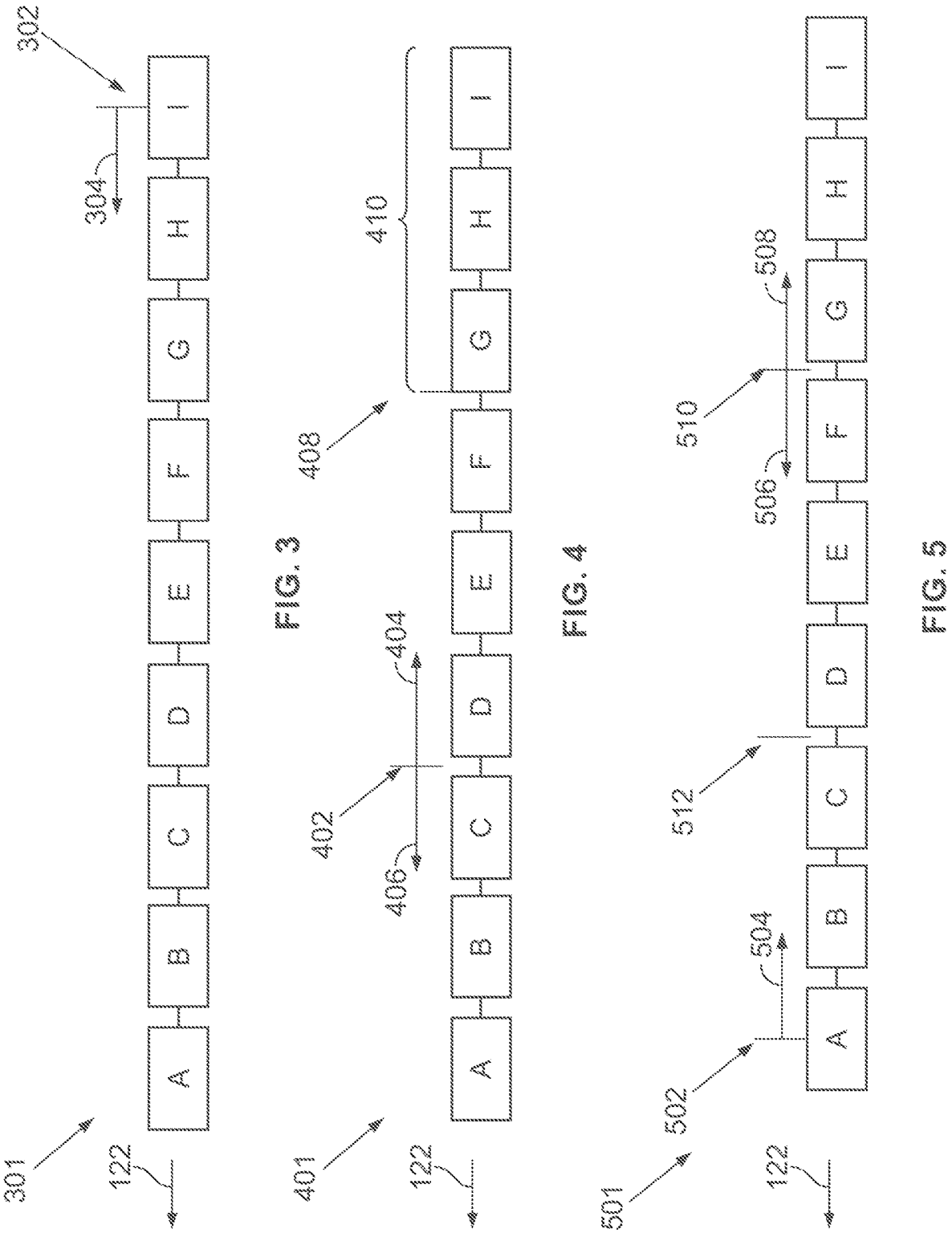
FIG. 3 illustrates one example of controlling a braking system of a vehicle system.
FIG. 4 illustrates one example of controlling a braking system of a vehicle system.
FIG. 5 illustrates one example of controlling a braking system of a vehicle system.

FIG. 3 illustrates one example of controlling a braking system of a vehicle system 301. One or more vehicles may receive one or more command messages directing each of the braking devices of the corresponding vehicles when to apply the brakes or start a braking application. Optionally, the command message may include a brake setting or brake level. For example, the different vehicles may receive different command messages directing the vehicles to apply different brake settings to the respective vehicle braking devices. As one example, a command messages may direct vehicle A to change a brake setting from level 4 to level 2 at a time T1, and direct vehicle B to change a brake setting from level 4 to level 1 (e.g., brake harder than vehicle A) at a time T2, that is a moment in time after time T1. The rate of propagation may control a distance between vehicles (e.g., to control an amount of slacking, an amount of bunching, or a combination of the two).

Directing the vehicles when to apply the brakes or change a brake setting may control one or more of a direction of propagation of braking along the length of the vehicle system, a rate of propagation of braking along the vehicle system, or the like. Optionally, the command message may include a vehicle identification or identifier. In one embodiment, a single common command message may be communicated to each vehicle of the vehicle system. The common command message may include a vehicle identifier corresponding with a portion of the command message. For example, the common command message may be received by each vehicle, but the vehicles may only implement a portion of the command message associated with the corresponding vehicle based on a vehicle identifier associated with the corresponding portion of the command message. In alternative embodiments, a unique command message may be communicated with each vehicle of the vehicle system. One or more of the command messages may be communicated via a wired type of communication (e.g., communication cable) and/or communicated via a wireless type of communication to the vehicles of the vehicle system.

In the illustrated embodiment of FIG. 3, the command message may direct a braking application to begin or initiate at an initiation point 302. Additionally, the command message may control the braking application to propagate in a direction 304 from the initiation point along the length of the vehicle system. In the illustrated embodiment of FIG. 3, the initiation point is at a rear vehicle I, and the braking application propagates in a direction from the rear of the vehicle system towards a lead vehicle A of the vehicle system (e.g., in a direction of travel 122 of the vehicle system). For example, vehicle I brakes first, followed by vehicle H at a time after vehicle I brakes, then vehicle G at a time after vehicle H brakes, then vehicle F brakes at a time after vehicle G brakes, etc., along the length of the vehicle system toward vehicle A.

In one or more embodiments, the command message may direct the vehicles when to start the braking application relative to other vehicles. Directing the vehicles when to start the braking applications may control the direction of braking and the rate of propagation of the braking application along a length of the vehicle system (e.g., as illustrated in FIG. 3). Optionally, the command message may direct the vehicles when to brake with respect to the other braking devices in non-mechanically coupled vehicle systems (e.g., as illustrated in FIG. 2). For example, the command message may control a time in between braking applications of the different vehicles of the vehicle system. As one example, the command message may direct each vehicle to begin a braking application based on a moment in time (e.g., vehicle I brakes at time-stamp T1, vehicle H brakes at time-stamp T2, vehicle G brakes at time-stamp T3, etc.), to begin the braking application based on a length of time between braking applications of other vehicles (e.g., vehicle I brakes at time T1, vehicle H brakes at 5-seconds after vehicle I, vehicle G brakes at 5-seconds after vehicle H or at 7 seconds after vehicle I, or the like). For example, the rate of propagation may be and/or include a latency and/or lag speed between braking applications conducted by different vehicles. Optionally, vehicle H may brake at a predetermined time communicated in the command message (e.g., immediately after receiving the command message, 30 seconds after receiving the command message; at a predetermined time-stamp, etc.). Optionally, vehicle H may brake responsive to vehicle H reaching a designated location (e.g., a geospatial location, after the vehicle H reaches or moves past a wayside device, or the like). Optionally, vehicle H may brake responsive to a distance between vehicles H and I reaching a predetermined amount (e.g., to control an amount of stretch or slack between vehicles H and I).

FIG. 4 illustrates another example of controlling a braking system of a vehicle system 401. Each of the vehicles may receive one or more command messages directing each of the braking devices of the corresponding vehicles when to apply the brakes that may control one or more of a direction of propagation of braking along the length of the vehicle system, a rate of propagation of braking along the vehicle system, or the like. One or more command messages may be communicated to the vehicles A-I of the vehicle system. The command messages may control the braking application of the vehicle system and may include or otherwise indicate a first initiation point 402 and a second initiation point 408. Vehicles A through C included in a first portion of the vehicle system may receive a first command messages to control the braking applications of the braking devices of the vehicles A-C, vehicles D through F included in a second portion of the vehicle system may receive a second command message to control the braking applications of the braking devices of the vehicles D-F in a way that is different than vehicles A-C, and vehicles G through I included in a third portion of the vehicle system may receive a third command message to control the braking applications of the braking devices of the vehicles G-I that is different than vehicles A-C and vehicles D-F.

For example, the first command message may control the braking application of vehicles A-C to propagate from the first initiation point 402 in a direction 406. Additionally, the first command message may control a rate of the braking effort propagation from vehicle C to vehicle A in the first portion of vehicles in the direction 406. The second command message may control the braking application of vehicles D-F to propagate from the first initiation point 402 to the second initiation point 408 in a second direction 404. The second command message may control a rate of the braking effort propagation from vehicle D to vehicle F in the second portion of vehicles that may be substantially the same or a different rate than the rate of braking of vehicles C-A. The third command message may control the braking application of vehicles G through I within a portion or a section 410 to apply the corresponding brake devices at the same or substantially the same time. For example, the braking devices of vehicles G-I may begin braking applications at substantially the same time such that a distance (e.g., amount of slacking or amount of bunching) between each of the vehicles G-I may remain substantially unchanged.

FIG. 5 illustrates another example of controlling a braking system of a vehicle system 501. Each of the vehicles may receive one or more command messages directing each of the braking devices of the corresponding vehicles when to apply the brakes that may control one or more of a direction of propagation of braking along the length of the vehicle system, a rate of propagation of braking along the vehicle system, or the like. Vehicles A through C may receive a first command message, vehicles D through F may receive a second command message that is different than the first command message, and vehicles G through I may receive a third command message that is different than the first and second command messages.

The first command message controls the braking application of vehicles A through C to begin at a first initiation point 502 and move in a direction 504 toward a point 512. The second command message controls the braking application of vehicles D through F to begin at a second initiation point 510 and move in a direction 506 toward the point 512. The third command message controls the braking application of vehicles G through I to begin at the second initiation point 510 and move in a direction 508. The first command message directed to vehicles A through C may control the braking applications between vehicles A through C to propagate at a first rate. The second command message directed to vehicles D through F may control the braking applications from vehicle F to vehicle D to propagate at a second rate that may be the same or different than the first rate of braking between vehicles A through C. The third command message directed to vehicles G through I may control the braking applications between vehicles G through I to propagate at a third rate that may be the same or different than the first and second rates.

In one or more embodiments, the command messages may direct the braking devices of one or more vehicles of the vehicle system to increase braking efforts and may direct the braking devices of one or more other vehicles of the vehicle system to decrease braking efforts. Optionally, the command messages may direct the braking devices of one or more vehicles of the vehicle system to increase braking efforts to a first amount or first level and may direct the braking devices of one or more other vehicles to increase to a different, second amount or second level. Optionally, the command messages may direct the braking devices of one or more vehicles of the vehicle system to decrease braking efforts to a first amount or first level, and may direct the braking devices of one or more other vehicles of the vehicle system to decrease to a different, second amount or second level. Optionally, the command messages may direct the braking devices to decrease braking efforts and propagate in a first direction from a first initiation point, and may direct the braking devices to increase braking efforts and propagate in a second direction from the first initiation point. For example, the command messages may indicate that a middle vehicle may be the initiation point, and the vehicles forward of the initiation point (e.g., in the direction of movement of the vehicle system) may increase braking efforts with a direction of propagation from the initiation point toward a lead vehicle of the vehicle system, and the vehicles to rear of the initiation point may decrease braking efforts with a direction of propagation from the initiation point toward a rear vehicle of the vehicle system. Optionally, the command messages may control the braking devices of a braking system of a vehicle system in any alternative manner.

In one or more embodiments, the command messages may direct the vehicles to substantially simultaneously begin braking applications with each other vehicle, upon receipt of the command message, or the like. For example, the vehicles may simultaneously begin braking applications, may begin braking applications within a fraction of a second of each other, may begin braking applications within seconds of each other, or the like. In one or more embodiments, the command messages may control delays between braking actions by different vehicles (e.g., adjacent vehicles, nonadjacent vehicles, or the like). As one example, the delay between braking applications may be used to control distances between two or more vehicles (e.g., an amount of slack or amount of bunching between adjacent vehicles or between a portion of vehicles). For example, a first portion of the vehicle system may include three vehicles and a second portion of the vehicle system may include four vehicles. A distance between the three vehicles of the first portion may need to decrease such that the three vehicles may be bunched closer together. Additionally, a distance between the four vehicles of the second portion may need to increase such that the four vehicles may be stretched further apart from each other. In one or more embodiments, the command messages may control the vehicle system to cause one of the vehicles to come to a stop at a first location, such as to enable the vehicle to load and/or unload cargo.

In one or more embodiments, the vehicle system may include plural vehicles that may be mechanically separated from each other that may travel together, such as in a convoy (e.g., such as the vehicle system 201 illustrated in FIG. 2). The command messages may control a direction of braking application, and a rate of braking application of each of the vehicles of the mechanically separated vehicle system. The command messages controlling the different vehicles to brake at a different rate, at a different time, or the like, may result in a vehicle designated as a head-of-vehicle (HOV), such as a lead vehicle in a direction of movement of the vehicle system, to change. For example, a first vehicle may brake harder than a second vehicle, such that the second vehicle may move in front of the first vehicle (e.g., in the direction of movement of the vehicle system). The first vehicle may lose the HOV designation, and the second vehicle may be designated a new lead vehicle or new HOV based on the second vehicle moving ahead of the first vehicle. For example, the designation HOV, or similarly EOV, may dynamically change based on a braking application changing a position of a vehicle in a lead and a vehicle in a rear, in the direction of travel of the vehicle system.

Figure 6:
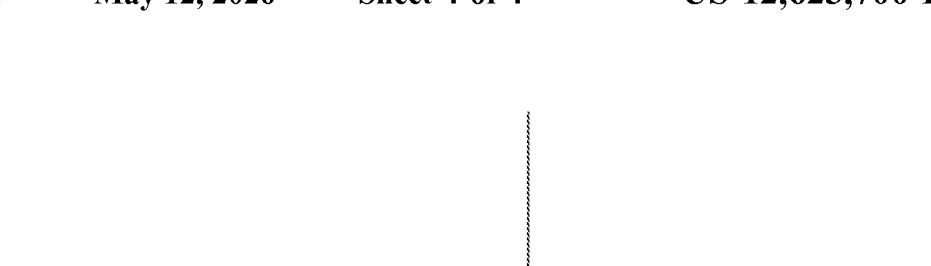
FIG. 6 illustrates a vehicle system traversing a route feature in accordance with one embodiment.

In one or more embodiments, the command message may direct the vehicles to begin the braking application based on a geospatial location (e.g., each vehicle starts a braking application when the vehicle reaches a predetermined location), or the like. For example, FIG. 6 illustrates one example of a vehicle system 601 traversing a route feature 608 in accordance with one embodiment. In the illustrated embodiment, the route feature is a hill that includes a start position 602, an end position 606, and an apex 604. Optionally, the route feature may be another geographical feature, such as a valley. Optionally, the route feature may be an infrastructure, such as a bridge, a cave, a route intersection (e.g., vehicle and/or pedestrian), a route switch, or the like. The vehicle system moves along the route in the direction 122. The vehicles may receive one or more command messages that may control one or more operations of the vehicles. As one example, the command message may direct the vehicles to change a brake setting (e.g., increase brake efforts or decrease brake efforts) when the vehicle reaches the apex of the route feature, moves past the apex, or the like. For example, as the vehicles move from the start position 602 toward the apex, the command message may control the vehicles to decrease braking efforts (e.g., release the brakes, brake less, etc.). The command message may control the vehicles to increase braking efforts (e.g., brake harder) after the vehicle moves past the apex. For example, the vehicles moving down the hill may brake harder than the vehicles moving up the hill.

In one or more embodiments, the command messages may control the one or more vehicles to apply a braking event based on a position of each vehicle relative to each other vehicle of the vehicle system. For example, the command message may control a first portion of vehicles of a vehicle system to pulse the brakes (e.g., increase and decrease braking efforts at a predetermined rate and at predetermined times), and may control a second portion of vehicles to pulse at different rates and/or different times. Pulsing the brakes of the first portion of vehicles at different rates and/or different times than the second portion of vehicles may control the vehicle system to move like an accordion or inch-worm as the vehicle system slows and/or stops movement. Optionally, the command messages may control the vehicles of the vehicle system to slow and/or stop in one or more different manners to achieve one or more different end results, such as bunching a first portion, stretching a second portion, controlling one vehicle to stop at a first location and controlling another vehicle to stop at another location, to reduce an amount of stress on couplers disposed between adjacent vehicles, to control an amount of comfort or discomfort felt or otherwise observed by a passenger of the vehicle system, or the like.

In one or more embodiments, the command message may be based on information associated with the vehicle system, such as, but not limited to, a length of the vehicle system (e.g., number of vehicles), position of one or more vehicles of the vehicle system (e.g., geographic position, a position of one vehicle relative a position of another vehicle, or the like), an amount and/or type of cargo the vehicle system may be carrying (e.g., produce, human passengers, industrial equipment, military equipment, or the like), one or more rules or regulations (e.g., speed or noise limits, prohibited air or water space, or the like), or the like.

In one or more embodiments, the onboard and/or off-board controller may automatically communicate the command messages to the vehicles of the vehicle system. For example, the controller may automatically communicate the command messages responsive to the vehicle system reaching a predetermined location along the route, responsive to the vehicle system operating according to a predetermined operating setting for a predetermined amount of time, responsive to the vehicle system changing an operating setting (e.g., changing a brake setting, changing a propulsion setting, or the like), responsive to the vehicle system moving for a predetermined amount of time, or the like. Alternatively, an operator onboard and/or off-board the vehicle system may manually communicate the command messages to the vehicles of the vehicle system. For example, an operator onboard the vehicle system may manipulate an input/output device of the onboard controller to communicate the command messages to the vehicles. In one or more embodiments, the operator may select a distance option, such as compress, stretch, or position options. A memory of the onboard controller may include instructions associated with each of the distance options, and the onboard controller may communicate the associated instructions to each of the vehicles of the vehicle system.

In one or more embodiments of the subject matter described herein, a system includes one or more processors to control operation of an air brake system having plural braking devices each disposed on a different vehicle of a vehicle system and configured to control braking efforts in the air brake system via the braking device disposed onboard the corresponding vehicle. The one or more processors may communicate one or more command messages to the braking devices to control one or more of a rate of a braking effort propagation along the vehicle system or a direction of the braking effort propagation between the plural braking devices.

Optionally, the one or more processors may communicate one of the one or more command messages to each of the plural braking devices.

Optionally, the one or more processors may control the direction of the braking effort propagation between the plural braking devices along the vehicle system by controlling the braking devices based on locations of the plural braking devices.

Optionally, the one or more processors may control the rate of the braking effort propagation along the vehicle system in order to control bunching or stretching between two or more vehicles of the vehicle system.

Optionally, the one or more processors may control the braking devices of a first portion of vehicles of the vehicle system to control braking efforts of the braking devices of the first portion at a first rate and control the braking devices of a second portion of the vehicle system to control braking efforts of the braking devices of the second portion at a different, second rate.

Optionally, the one or more command messages may include a vehicle identifier associated with one or more of the braking devices or the different corresponding vehicles. A first command message having a first vehicle identifier may be received by a first braking device, and a second command message having a second vehicle identifier may be received by a second braking device.

Optionally, the first command message may be different than the second command message to control operation of the first vehicle in a way that is different than the second vehicle.

Optionally, the one or more processors may be disposed onboard the vehicle system.

Optionally, the one or more command messages may include an instruction of implementation to the one or more braking devices.

Optionally, the instruction of implementation may be based on one or more of a time or a location of the braking devices.

Optionally, the one or more processors may communicate the one or more command messages including the instruction of implementation ahead of a time of a braking event of the vehicle system.

Optionally, the one or more processors may automatically communicate the one or more command messages to the braking devices.

Optionally, the one or more processors may wirelessly communicate the one or more command messages to the braking devices.

Optionally, the one or more processors may control the braking effort propagation to move in two or more directions from an initiation point within the vehicle system. The braking efforts in the air brake system may propagate in a first direction from the initiation point and the braking efforts in the air brake system may propagate in a second direction from the initiation point.

Optionally, the one or more processors may control the direction of the braking effort propagation between the plural braking devices and along the vehicle system by controlling the braking devices based on locations of the plural braking devices.

Optionally, the first command message may be different than the second command message to control operation of the first vehicle in a way that is different than the second vehicle.

Optionally, the control system may control the braking effort propagation to propagate in two or more directions along the vehicle system from an initiation point within the vehicle system. The braking efforts in the air brake system may propagate in a first direction from the initiation point and the braking efforts in the air brake system may propagate in a second direction from the initiation point.

In one or more embodiments of the subject matter described herein, a system includes one or more processors to control operation of an air brake system having plural braking devices each disposed onboard a different vehicle of a vehicle system and configured to control braking efforts in the air brake system via the braking device disposed onboard the corresponding vehicle. The one or more processors may communicate one or more command messages to the braking devices. The command messages may include a vehicle identifier associated with one or more of the braking devices or the different corresponding vehicles. A first command message including a first vehicle identifier may be received by a first braking device and a second command message comprising a second vehicle identifier may be received by a second braking device. The one or more command messages may control one or more of a rate of a braking effort propagation along the vehicle system or a direction of the braking effort propagation between the plural braking devices.

In one or more embodiments of the subject matter described herein, a method includes communicating one or more command messages to plural braking devices of an air brake system. Each of the plural braking devices may be disposed onboard a different vehicle of a vehicle system. The one or more command messages may control braking efforts in the air brake system via the braking device disposed onboard the corresponding vehicle. The one or more command messages may control a direction of a braking effort propagation between the plural braking devices by controlling the braking devices based on locations of the plural braking devices. The one or more command messages may control a rate of the braking effort propagation along the vehicle system in order to control a distance between two or more vehicles of the vehicle system.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors configured to control operation of an air brake system having plural braking devices each disposed on a different vehicle of a vehicle system and configured to control braking efforts in the air brake system via the braking device disposed onboard the corresponding vehicle,
the one or more processors configured to identify an initiation point at which braking efforts are configured to originate, the initiation point defined by a location along a length of the vehicle system and associated with at least one of the plural braking devices or at least one of the different vehicles of the vehicle system,
the one or more processors configured to communicate one or more command messages to the braking devices to control one or more of a rate of a braking effort propagation along the vehicle system or a direction of the braking effort propagation between the plural braking devices based on a location of each of the braking devices relative to the initiation point.

2. The system of claim 1, wherein the one or more processors are configured to communicate one of the one or more command messages to each of the plural braking devices.

3. The system of claim 1, wherein the one or more processors are configured to control the direction of the braking effort propagation between the plural braking devices along the vehicle system by controlling the plural braking devices based on locations of the plural braking devices.

4. The system of claim 1, wherein the one or more processors are configured to control the rate of the braking effort propagation along the vehicle system in order to control bunching or stretching between two or more vehicles of the vehicle system.

5. The system of claim 1, wherein the one or more processors are configured to control the braking devices of a first portion of vehicles of the vehicle system to control braking efforts of the braking devices of the first portion at a first rate and control the braking devices of a second portion of vehicles of the vehicle system to control braking efforts of the braking devices of the second portion at a different, second rate.

6. The system of claim 1, wherein the one or more command messages include a vehicle identifier associated with one or more of the braking devices or the different corresponding vehicles, wherein a first command message comprising a first vehicle identifier is configured to be received by a first braking device, and a second command message comprising a second vehicle identifier is configured to be received by a second braking device.

7. The system of claim 6, wherein the first command message is different than the second command message to control operation of the first vehicle in a way that is different than the second vehicle.

8. The system of claim 1, wherein the one or more processors are configured to be disposed onboard the vehicle system.

9. The system of claim 1, wherein the one or more command messages include an instruction of implementation to the one or more braking devices.

10. The system of claim 9, wherein the instruction of implementation is based on one or more of a time or a location of the braking devices.

11. The system of claim 9, wherein the one or more processors are configured to communicate the one or more command messages including the instruction of implementation ahead of a time of a braking event of the vehicle system.

12. The system of claim 1, wherein the one or more processors are configured to automatically communicate the one or more command messages to the braking devices.

13. The system of claim 1, wherein the one or more processors are configured to wirelessly communicate the one or more command messages to the braking devices.

14. The system of claim 1, wherein the one or more processors are configured to control the braking effort propagation to propagate in two or more directions along the vehicle system from the initiation point within the vehicle system, wherein the braking efforts in the air brake system are configured to propagate in a first direction from the initiation point and the braking efforts in the air brake system are configured to propagate in a second direction from the initiation point.

15. A system comprising:
one or more processors configured to control operation of an air brake system having plural braking devices each disposed on a different vehicle of a vehicle system and configured to control braking efforts in the air brake system via the braking device disposed onboard the corresponding vehicle,
the one or more processors configured to identify an initiation point at which braking efforts are configured to originate, the initiation point defined by a location along a length of the vehicle system and associated with at least one of the plural braking devices or at least one of the different vehicles of the vehicle system, the one or more processors configured to communicate one or more command messages to the plural braking devices, the one or more command messages being based at least in part on a location of one or more of the braking devices or the different vehicles relative to the initiation point, the one or more command messages including a vehicle identifier associated with one or more of the plural braking devices or the different corresponding vehicles, wherein a first command message comprising a first vehicle identifier is configured to be received by a first braking device, and a second command message comprising a second vehicle identifier is configured to be received by a second braking device, wherein the one or more command messages are configured to control one or more of a rate of a braking effort propagation along the vehicle system or a direction of the braking effort propagation between the plural braking devices.

16. The system of claim 15, wherein the one or more processors are configured to control the direction of the braking effort propagation between the plural braking devices along the vehicle system by controlling the plural braking devices based on locations of the plural braking devices.

17. The system of claim 15, wherein the one or more processors are configured to control the rate of the braking effort propagation along the vehicle system in order to control a distance between two or more vehicles of the vehicle system.

18. The system of claim 15, wherein the first command message is different than the second command message to control operation of the first vehicle in a way that is different than the second vehicle.

19. The system of claim 15, wherein the control system is configured to control the braking effort propagation to propagate in two or more directions along the vehicle system from the initiation point within the vehicle system, wherein the braking efforts in the air brake system are configured to propagate in a first direction from the initiation point and the braking efforts in the air brake system are configured to propagate in a second direction from the initiation point.

20. A method comprising:
identifying an initiation point at which braking efforts are configured to originate, the initiation point defining a location along a length of a vehicle system;
communicating one or more command messages to plural braking devices of an air brake system, each of the plural braking devices disposed on a different vehicle of the vehicle system, the one or more command messages being based at least in part on a location of one or more of the braking devices or the different vehicles relative to the initiation point, the initiation point associated with one or more of at least one of the plural braking devices or at least one of the different vehicles of the vehicle system, the one or more command messages configured to control braking efforts in the air brake system via the braking device disposed onboard the corresponding vehicle,
wherein the one or more command messages are configured to control a direction of a braking effort propagation between the plural braking devices in one or more directions from the initiation point by controlling the braking devices based on locations of the plural braking devices, and
wherein the one or more command messages are configured to control a rate of the braking effort propagation along the vehicle system in one or more directions from the initiation point in order to control a distance between two or more vehicles of the vehicle system.

* * * * *